US012531279B2

(12) United States Patent
Miyazaki et al.

(10) Patent No.: US 12,531,279 B2
(45) Date of Patent: Jan. 20, 2026

(54) DETECTION DEVICE

(71) Applicant: ALPS ALPINE CO., LTD., Tokyo (JP)

(72) Inventors: Shun Miyazaki, Miyagi (JP);
Hiromichi Koyanagawa, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 663 days.

(21) Appl. No.: 17/657,975

(22) Filed: Apr. 5, 2022

(65) Prior Publication Data
US 2022/0384857 A1 Dec. 1, 2022

(30) Foreign Application Priority Data

May 28, 2021 (JP) .................. 2021-090620

(51) Int. Cl.
H01M 10/42 (2006.01)
G01D 11/24 (2006.01)
G01H 1/00 (2006.01)
G01K 1/08 (2021.01)

(52) U.S. Cl.
CPC ........ H01M 10/425 (2013.01); G01D 11/245 (2013.01); G01H 1/00 (2013.01); G01K 1/08 (2013.01); H01M 2010/4278 (2013.01)

(58) Field of Classification Search
CPC .... G01P 21/00; G01P 15/123; H01M 10/425; H01M 10/48; H01M 10/486; H01M 2010/4278; H01M 50/202; H01M 50/242; H01M 10/42; H04W 24/10; G01D 11/245; G01H 1/00; G01K 1/08; Y02E 60/10

USPC ........................................... 73/649
See application file for complete search history.

(56) References Cited

U.S. PATENT DOCUMENTS 4,029,954 A * 6/1977 Moyer .................. F21V 21/002
362/183
5,952,803 A * 9/1999 Canada ................ G01R 33/028
73/431
6,839,660 B2 * 1/2005 Eryurek ............. G05B 23/0229
702/65
(Continued)

FOREIGN PATENT DOCUMENTS

DE 102011109250 A1 * 2/2013 .......... H01M 50/276
JP 2000-234954 8/2000
(Continued)

OTHER PUBLICATIONS

Japanese Office Action for JP2021-090620 dated Jul. 2, 2024.
Japanese Office Action for JP2021-090620 dated Sep. 17, 2024.

Primary Examiner — John E Breene
Assistant Examiner — Daniel M Quinn
(74) Attorney, Agent, or Firm — IPUSA, PLLC

(57) ABSTRACT

A detection device has: a case member; a cover member; a substrate, provided in a space surrounded by the case member and the cover member, the substrate having mounted thereon a wireless communication circuit and a sensor configured to measure a physical quantity; a battery housed in the space; and a metal pedestal part disposed in the space on a same side as the case member, the pedestal part has an end portion facing the sensor in the space, and the battery is housed in part of the space that is on a same side as the pedestal part with respect to the substrate.

10 Claims, 6 Drawing Sheets

(56) References Cited

U.S. PATENT DOCUMENTS

| | | | | |
|---|---|---|---|---|
| 6,956,169 B1 * | 10/2005 | Shotey | ............... | H02G 3/121 |
| | | | | 174/67 |
| 9,008,854 B2 * | 4/2015 | Breed | ............... | G01C 21/26 |
| | | | | 701/1 |
| 10,485,478 B1 * | 11/2019 | Mirov | ............... | A61B 5/14551 |
| 10,753,987 B2 * | 8/2020 | McGee | ............... | G08G 1/042 |
| 2009/0308494 A1 * | 12/2009 | Linn | ............... | B67D 1/0875 |
| | | | | 210/85 |
| 2013/0304385 A1 * | 11/2013 | Gillette | ............... | G01M 15/12 |
| | | | | 702/6 |
| 2015/0198578 A1 * | 7/2015 | Worden | ............... | G01F 23/263 |
| | | | | 73/53.05 |
| 2017/0092994 A1 * | 3/2017 | Canfield | ............ | H01M 10/0436 |
| 2017/0273597 A1 * | 9/2017 | Schuelke | ............... | H02J 50/80 |
| 2019/0184773 A1 | 6/2019 | Saito | | |
| 2020/0221269 A1 * | 7/2020 | Tramiel | ............... | H04W 24/10 |
| 2025/0279298 A1 * | 9/2025 | Tian | ............... | H01J 37/32724 |

FOREIGN PATENT DOCUMENTS

| | | | | |
|---|---|---|---|---|
| JP | 2014-182073 | | 9/2014 | |
| JP | 2015-230255 | | 12/2015 | |
| JP | 2018-039377 | | 3/2018 | |
| JP | 2018-112477 | | 7/2018 | |
| JP | 2020-139753 | | 9/2020 | |
| WO | WO-0181884 A3 * | 2/2002 | ............ | F16C 17/24 |
| WO | WO-03084020 A1 * | 10/2003 | ............ | H05K 5/0247 |
| WO | WO-2004090504 A2 * | 10/2004 | ............ | F16N 29/02 |
| WO | WO-2014062840 A1 * | 4/2014 | ............ | G08B 25/004 |
| WO | WO-2017221001 A1 * | 12/2017 | ............ | G01D 21/00 |

* cited by examiner

DETECTION DEVICE

CROSS-REFERENCE TO RELATED APPLICATIONS

This application is based on and claims priority to Japanese Patent Application No. 2021-090620, filed on May 28, 2021, the entire contents of which are incorporated herein by reference.

BACKGROUND OF THE INVENTION

1. Field of the Invention

The present disclosure relates to a detection device.

2. Description of the Related Art

Conventionally, arts related to sensor devices have been proposed, whereby, for example, a sensor device is attached to an object that is targeted for measurement, such as a large pump or a motor, and the sensor device acquires information for learning the condition of the measurement-target object, from the measurement-target object.

In recent years, sensor devices tend to have a communication module in order to enable the sensor devices to diagnose the object that is targeted for measurement, even from remote locations. Consequently, in addition to a vibration sensor, a temperature sensor, and so forth, a communication module and a battery are placed in the case constituting such a sensor device.

Inside this case, the vibration sensor and the temperature sensor are provided at positions where conditions of the measurement-target object can be measured accurately. It is preferable to provide the communication module at a position where communication is possible. In view of this, the related art has proposed, for example, a structure in which the inside of a case is multi-layered by using rigid-flexible substrates, the sensors are provided in layers near the object that is targeted for measurement, the communication module is provided in a layer located near the outer side of the case, on the opposite side from the layers near the measurement-target object, and the battery is provided in a layer located in between these layers.

Meanwhile, in the structure disclosed in patent document 1 below, a wireless circuit and a vibration sensor are disposed on one substrate, and a spacer, a battery, and so forth are disposed in layers between the vibration sensor and the measurement-target object. By applying the structure disclosed in patent document 1, it is possible to reduce the manufacturing cost because no rigid-flexible substrates are used.

CITATION LIST

Patent Document

[Patent Document 1] Japanese Unexamined Patent Application Publication No. 2020-139753

SUMMARY OF THE INVENTION

According to at least one embodiment of the present disclosure, a detection device has a case member; a cover member; a substrate, provided in a space surrounded by the case member and the cover member, the substrate having mounted thereon a wireless communication circuit and a sensor configured to measure a physical quantity; a battery housed in the space; and a metal pedestal part disposed in the space on a same side as the case member, the pedestal part has an end portion facing the sensor in the space, and the battery is housed in part of the space that is on a same side as the pedestal part with respect to the substrate.

DESCRIPTION OF THE PREFERRED EMBODIMENTS

According to at least one embodiment of the present disclosure, for example, a detection device's internal structure is made simple by disposing sensors and a wireless communication circuit on a substrate, and the structure between the sensor and the object that is targeted for measurement is made simple, so that the accuracy of measurement can be improved.

Now, an embodiment of the present disclosure will be described below with reference to the accompanying drawings. In the embodiment described below, a sensor device (an example detection device) accommodating a vibration sensor, a temperature sensor, and so forth will be described as an example detection device.

First Embodiment

Figure 1:
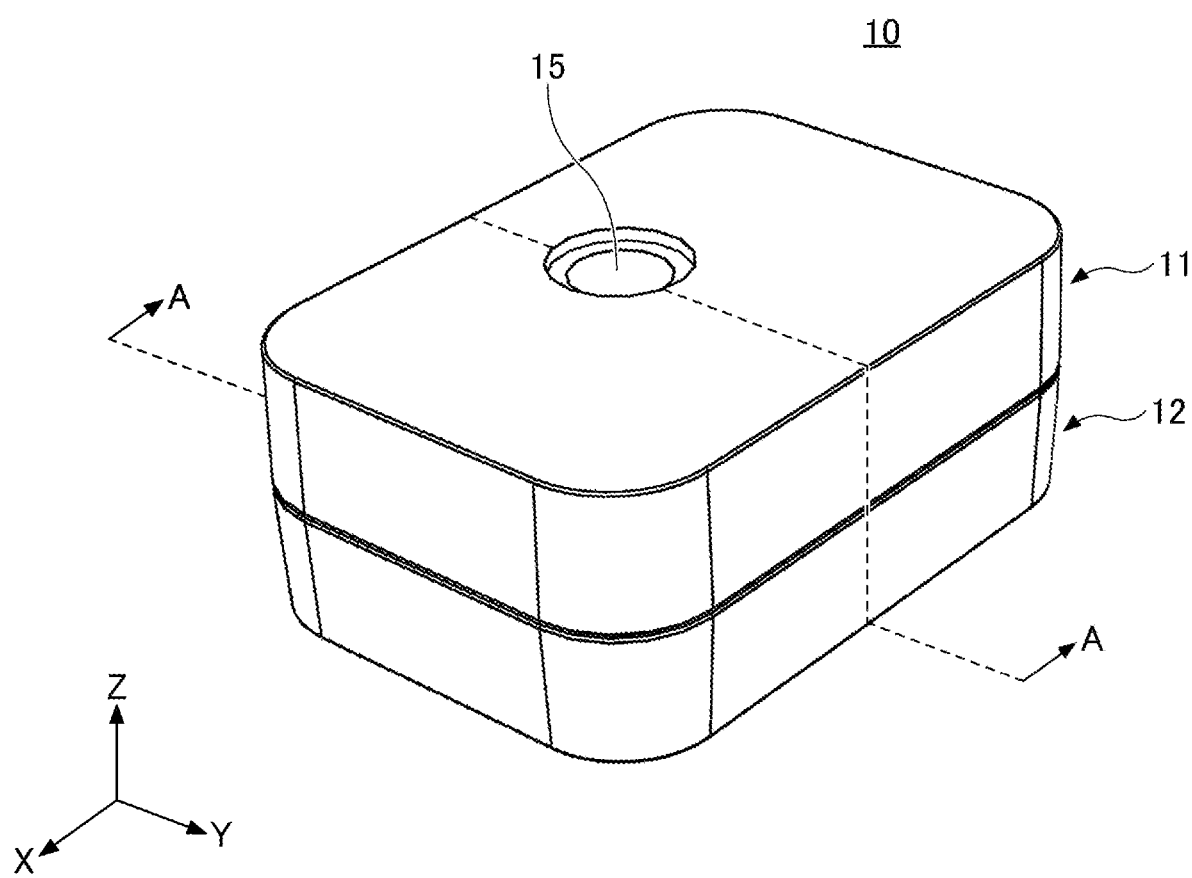
FIG. 1 is an external perspective view of a sensor device according to a first embodiment.

FIG. 1 is an external perspective view of a sensor device according to the first embodiment. As shown in FIG. 1, the height direction (Z-axis direction), the vertical direction (X-axis direction), and the horizontal direction (Y-axis direction) of the sensor device 10 will define each direction of the sensor device 10.

As shown in FIG. 1, the appearance of the sensor device 10 is constituted by fitting together a case main body 12 (an example case member) and a cover body 11 (an example cover member). As shown in FIG. 1, in the sensor device 10, a through-hole 15 that is for screwing and penetrates through the cover body 11 and the case main body 12 is provided. When the object to be targeted for measurement is threaded, it is possible to screw the sensor device 10 to the measurement-target object.

The object to be targeted for measurement may be any object, and, for example, an object that vibrates, such as a large pump or a motor, is possible.

Figure 2:
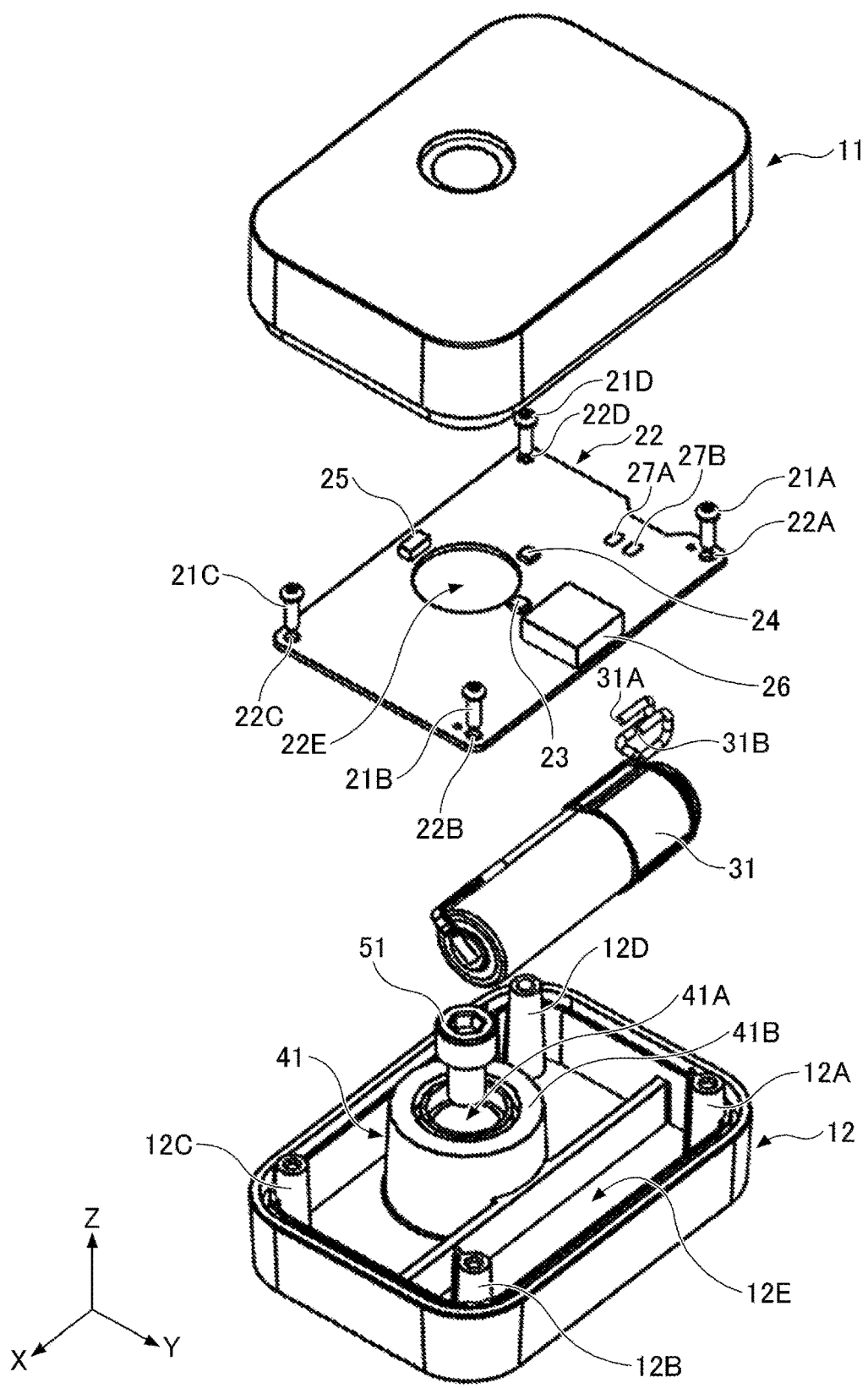
FIG. 2 is an exploded perspective view of an internal structure of the sensor device according to the first embodiment.

FIG. 2 is an exploded perspective view showing an internal structure of the sensor device 10 according to the present embodiment. As shown in FIG. 2, the sensor device 10 includes the cover body 11, screws 21A to 21D, a substrate 22, a battery 31, a screw 51, and the case main body 12.

The cover body 11 is formed in a box shape having a substantially rectangular upper surface with rounded corners, by using a synthetic resin material such as plastic. By using a synthetic resin material for the cover body 11 according to the present embodiment, a wireless communication module 26 (an example wireless communication circuit), which will be described later, can perform wireless communication with an external device via the cover body 11. Although a case will be described below in which a synthetic resin material such as plastic is used as an example of the resin material for the cover body 11 of the present embodiment, the resin material is by no means a limitation, and any material may be used as long as it does not interfere with the wireless communication that the wireless communication module 26 performs.

In the substrate 22, an opening portion 22E that corresponds with the through-hole 15 is provided. Furthermore, the wireless communication module 26, an acceleration sensor 23, the temperature sensor 24, and a piezo sensor 25 are mounted on the substrate 22. Furthermore, electrodes 27A and 27B for connecting with the battery 31 are provided in the substrate 22. As shown in FIG. 2, the substrate 22 is provided in the space surrounded by the cover body 11 and the case main body 12.

By connecting with the terminals 31A and 31B of the battery 31, the electrodes 27A and 27B are able to supply electric power to the wireless communication module 26 and a variety of sensors provided on the substrate 22 (for example, the acceleration sensor 23, the temperature sensor 24, and the piezo sensor 25).

The wireless communication module 26 is a module for performing wireless communication with an external device. As for the technique of wireless communication for the wireless communication module 26 according to the present embodiment, for example, it is possible to use wireless communication schemes such as Wi-Fi (registered trademark), Bluetooth (registered trademark), Sigfox (registered trademark), and so forth. Note that the external device with which the wireless communication module 26 communicates may be a communication terminal used by a worker, a management server at a monitoring center connected via a public network, and so forth.

The acceleration sensor 23 and the piezo sensor 25 are used as vibration sensors for detecting the vibration of the measurement-target object. Although an example in which the acceleration sensor and the piezo sensor 25 are provided will be described with this embodiment, it is equally possible to provide only one of the acceleration sensor 23 and the piezo sensor 25. The temperature sensor 24 detects the temperature of the measurement-target object.

Signals to indicate the results of detection in each of the acceleration sensor 23, the temperature sensor 24, and the piezo sensor 25 are transmitted to the external device via the wireless communication module 26.

Furthermore, the sensors to be provided in the sensor device 10 of the present embodiment are by no means limited to the above-described acceleration sensor 23, temperature sensor 24, and piezo sensor 25, and may be any sensors that can measure physical quantities related to the measurement-target object.

The battery 31 supplies electric power to the substrate 22, and is placed in the storage field 12E of the case main body 12.

The case main body 12 is formed in a box-shape with a substantially rectangular bottom surface with rounded corners so that the case main body 12 can be fitted with the cover body 11. The bottom surface of the case main body 12 in the negative Z-axis direction is brought into contact with the measurement-target object.

Furthermore, the case main body 12 includes a pedestal part 41. The pedestal part 41 according to this embodiment is integrally molded with the case main body 12. The case main body 12 and the pedestal part 41 are, for example, a zinc die-cast product, an aluminum die-cast product, or metal such as SUS (Steel Use Stainless).

The pedestal part 41 protrudes from the surface (the inner bottom surface of the case main body 12) of the case main body 12 facing the positive Z-axis direction (facing the inside of the case main body 12), in the direction where there are the cover body 11 and the substrate 22.

The height (distance) of the pedestal part 41 in the case main body 12 in the Z-axis direction (the direction towards the end surface 41B of the pedestal part 41 from the outer surface of the case main body 12 on the measurement-target object side) is formed higher than the height (distance) of the battery 31 in the Z-axis direction (the same direction as the direction towards the end surface 41B of the pedestal part 41 from the outer surface of the case main body 12 on the measurement-target object side). To be more specific, the distance from the outer surface of the case main body 12 on the measurement-target object side to the end surface 41B of the pedestal part 41 is longer than the distance obtained by adding the thickness of the case main body 12 in the Z-axis direction near the battery 31 to the height (distance) of the battery 31 in the Z-axis direction.

According to the present embodiment, the height of the pedestal part 41 in the Z-axis direction is made higher than the battery 31, so that the battery 31 can be housed on the same side as the pedestal part 41 with respect to the substrate 22. This prevents, in the sensor device 10, the battery from interfering with the wireless communication that the wireless communication module 26 performs.

A through-hole 41A for receiving the screw 51 is provided in the pedestal part 41. This through-hole 41A forms a portion of the through-hole 15 penetrating the sensor device 10.

The battery 31 is placed in the storage field 12E, so that the battery 31 is disposed on the same side as the case main body 12 and the pedestal part 41, with respect to the substrate 22. By means of this arrangement, the battery 31 is prevented from being provided between the wireless communication module 26 and the cover body 11.

Through-holes 22A to 22D are formed at the four corners of the substrate 22.

The case main body 12 has a bottom surface that contacts the measurement-target object. The case main body 12 has screw-receiving parts 12A to 12D at its four corners corresponding with the through-holes 22A to 22D formed in the substrate 22. Respective screw holes (holes) for fitting four screws 21A to 21D are formed in the screw-receiving parts 12A to 12D.

In the space inside the case main body 12 and the cover body 11, the screw-receiving parts 12A to 12D extend from the bottom surface of the case main body 12, in the Z-axis direction where there is the cover body 11, for a length substantially matching the length of the pedestal part 41 in the Z-axis direction. By this means, the sensor device 10 according to the present embodiment can stably hold the substrate 22 in contact with the pedestal part 41.

Furthermore, the sensor device 10 according to the present embodiment can hold the substrate 22 out of contact with the wall surfaces of the case main body 12 and the cover body 11 that are located on the X-axis direction side and the Y-axis direction side with respect to the substrate 22. Consequently, according to the present embodiment, it is possible to prevent noise such as vibration from the external environment (which is different from the measurement-target object) from reaching a variety of sensors mounted on the substrate 22 through the case main body 12 and the cover body 11.

The screws 21A to 21D screw the substrate to the screw-receiving parts 12A to 12D of the case main body 12. Furthermore, the screw 51 screws the sensor device 10 to the measurement-target object.

The end surface 41B (an example end portion) of the pedestal part 41, facing the cover body 11 and the substrate 22, is formed to be in contact with the bottom surface of the screwed substrate 22.

The acceleration sensor 23, the temperature sensor 24, and the piezo sensor 25 are provided at positions to face the end surface 41B of the pedestal part 41 via the substrate 22. The positions to face the end surface 41B of the pedestal part 41 via the substrate 22 are, for example, positions to face the end surface 41B with the substrate 22 in between, or, to be more specific, positions located right over the end surface 41B. That is, the acceleration sensor 23, the temperature sensor 24, and the piezo sensor 25 are provided at positions to overlap with the end surface 41B of the pedestal part 41 in top view from the positive Z-axis direction. By this means, the physical quantities of the measurement-target object are transmitted to the acceleration sensor 23, the temperature sensor 24, and the piezo sensor 25, via the pedestal part 41 and the substrate 22.

Figure 3:
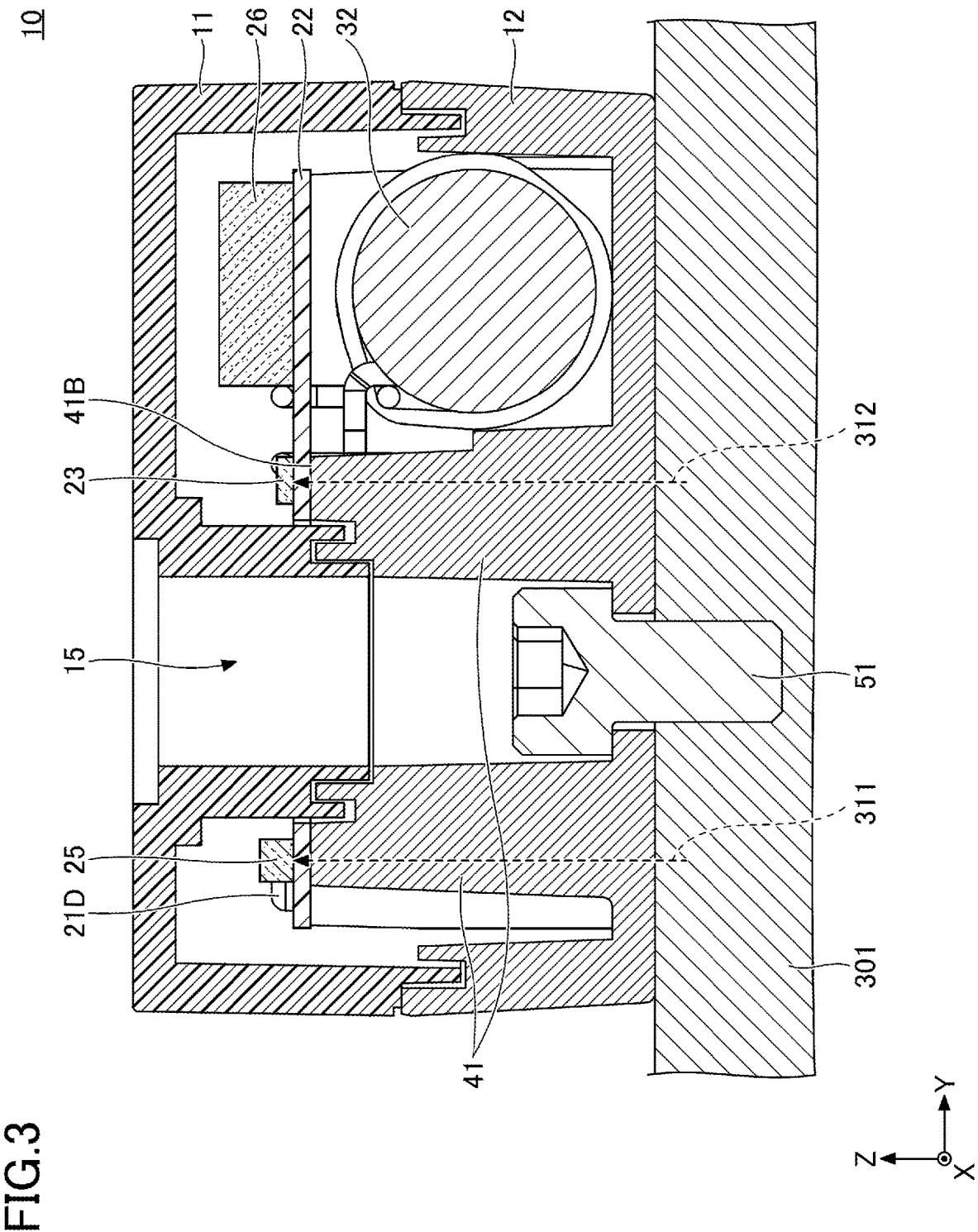
FIG. 3 is a cross-sectional view of a sensor device 10 according to the first embodiment, taken along line A in FIG. 1, showing a state in which the sensor device 10 is attached to a measurement-target object.

FIG. 3 is a cross-sectional view of the sensor device 10 according to the present embodiment, taken along line A in FIG. 1, showing a state in which the sensor device 10 is attached to an object that is targeted for measurement. As shown in FIG. 3, in the space that is formed inside when the cover body 11 and the case main body 12 of the sensor device 10 are fitted together, the substrate 22 and the battery 32 are disposed.

Furthermore, the sensor device 10 is attached to the measurement-target object 301 by using the screw 51.

As shown in FIG. 3, a variety of sensors (for example, the acceleration sensor 23 and the piezo sensor 25) are provided at positions to face the end surface 41B of the pedestal part 41 via the substrate 22 (with the substrate 22 in between). As described above, the pedestal part 41 is made of metal. The pedestal part 41 made of metal has a level of rigidity at which physical quantities related to physical phenomena produced by the measurement-target object 301 (for example, vibration) can be transmitted. By this means, the pedestal part 41 can accurately transmit physical quantities produced in the measurement-target object 301, such as that of vibration, to a variety of sensors (for example, the acceleration sensor 23 and the piezo sensor 25). The physical quantities to be detected by the variety of sensors are by no means limited to vibration, and any physical quantity may be used as long as it can be transmitted via the pedestal part 41. For example, sound may be a possible physical quantity to measure by using the variety of sensors. In this case, the variety of sensors may include a microphone for detecting the sound transmitted via the pedestal part 41.

Furthermore, according to the present embodiment, the thermal conductivity of the pedestal part 41 can be identified from the metal forming the pedestal part 41. Consequently, the temperature sensor 24 can also identify the temperature of the measurement-target object 301 as transmitted via the pedestal part 41.

Now, it is preferable to provide a variety of sensors in the vicinity of the object that is targeted for measurement. However, providing a variety of sensors near the measurement-target object makes it necessary to make the inside of the case multi-layered by using rigid-flexible substrates or the like that have been conventionally used, in order to dispose the communication module, the battery, and so forth at suitable positions.

In contrast with this, with the present embodiment, a variety of sensors are provided at positions to face the end surface 41B of the pedestal part 41, with the substrate 22 in between. By this means, the physical quantities related to the physical phenomena produced by the measurement-target object 301 travel through the pedestal part 41 made of metal, and are transmitted accurately (at high transmission rates), to the variety of sensors, along the direction indicated by arrows 311 and 312.

In addition, the height of the pedestal part 41 in the Z-axis direction is made higher than the battery 32. Therefore, with the sensor device 10 of the present embodiment, the battery 32 is placed below the substrate 22 (on the negative side in the Z-axis direction).

In this way, the battery 32 is placed below the substrate 22 (on the negative side in the Z-axis direction), so that the wireless communication module 26, provided on the substrate 22 (on the positive side in the Z-axis direction), can perform wireless communication with the external communication device, via the cover body 11, without being interfered with by the battery 32. Note that the cover body 11 is made of a synthetic resin material, and therefore does not interfere with wireless communication.

In the sensor device 10 according to the present embodiment, the substrate 22 is provided above the pedestal part 41 (on the positive side in the Z-axis direction), so that a variety of sensors and the wireless communication module 26 can be disposed on this one substrate 22, without using rigid-flexible substrates. In addition to that, since the variety of sensors are provided at positions on the substrate 22 facing the end surface 41B of the pedestal part 41, physical quantities such as that of vibration produced by the measurement-target object 301 can be detected accurately.

As described above, according to the present embodiment, a variety of sensors and a wireless communication module 26 can be disposed on a single substrate 22, without using rigid-flexible substrates, so that the manufacturing cost of the sensor device 10 can be reduced. Alternatively, a variety of sensors and a wireless communication module 26 can be disposed on a single substrate 22 without using multiple substrates (for example, the first substrate for mounting the variety of sensors and a second substrate for mounting the wireless communication module), so that the manufacturing cost of the sensor device 10 can be reduced. Furthermore, when manufacturing the sensor device 10 of the present embodiment, after the battery 32 is stored in the case main body 12, the substrate 22 may be placed on top of the pedestal part 41, and the through-holes 22A to 22D at the four corners may be screwed, so that, compared to conventional multi-layered sensor devices, the workload of manufacturing is lightened.

Note that, with this embodiment, an example in which the pedestal part 41 and the case main body 12 are integrally formed has been described. However, this example of forming the pedestal part 41 and the case main body 12 integrally in no way limits the present embodiment, and the pedestal part 41 and the case main body 12 may be provided as separate components as well. Furthermore, in the event the pedestal part 41 and the case main body 12 are provided as separate components, the pedestal part 41 is typically made of metal, but the case main body 12 need not be metal. Furthermore, the pedestal part 41 does not have to be metal as long as it has a level of rigidity at which the physical quantities of the measurement-target object 301 can be transmitted to the substrate 22. For the pedestal part 41 to have a level of rigidity at which the physical quantities of the measurement-target object 301 can be transmitted to the substrate 22, the pedestal part 41 may be rigid enough so that a vibration sensor can accurately detect the vibration of the measurement-target object 301, the temperature sensor 24 can accurately detect the temperature of the measurement-target object 301, and so forth.

In the sensor device 10 according to the present embodiment, the through-hole 15 is provided so as to include the through-hole 41A of the pedestal part 41. By this means, the sensor device 10 can be screwed to the measurement-target object 301, which makes it possible to attach and remove the sensor device 10 with ease.

In the sensor device 10 according to the present embodiment, the substrate 22 is in direct contact with the pedestal part 41, so that it is possible to improve the efficiency of transmission of physical quantities produced in the measurement-target object 301, such as that of vibration, to a variety sensors (for example, the acceleration sensor 23, the temperature sensor 24, and the piezo sensor 25) on the substrate via the pedestal part 41.

Second Embodiment

A case has been described with the above embodiment where the sensor device 10 is screwed to the measurement-target object 301. However, the embodiment described above by no means limits the technique for attaching the sensor device 10 to the measurement-target object 301 to screwing. So, an example of attaching the sensor device to the measurement-target object by using a magnetic force will be described below with a second embodiment.

Figure 4:
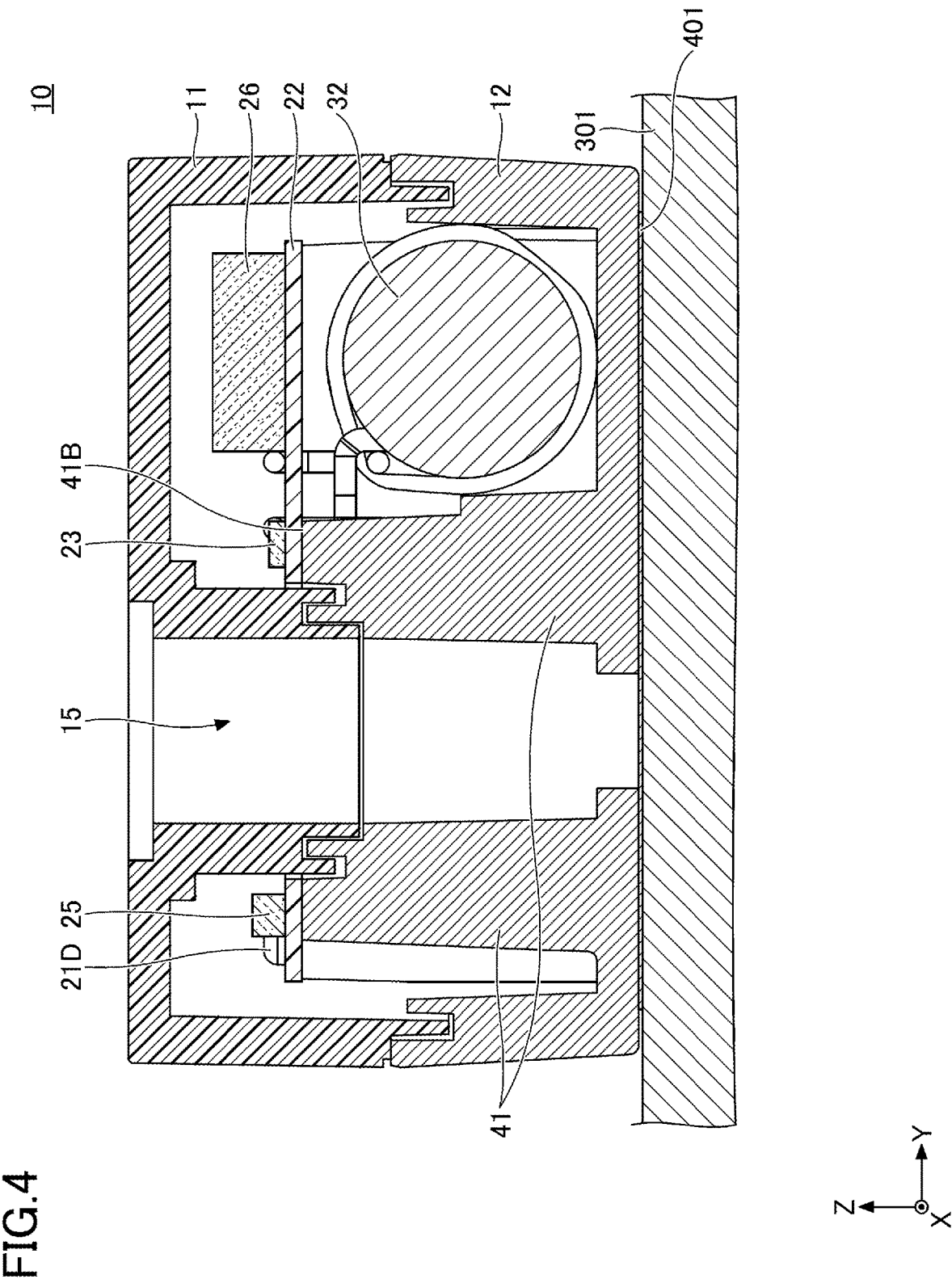
FIG. 4 is a cross-sectional view of a sensor device 10 according to a second embodiment, showing a state in which the sensor device 10 is attached to a measurement-target object.

FIG. 4 is a cross-sectional view of a sensor device 10 according to the present embodiment, showing a state in which the sensor device 10 is attached to an object that is targeted for the measurement. Note that the sensor device 10 according to the present embodiment has the same structure as that of the first embodiment, and therefore the description thereof will be omitted.

In the example shown in FIG. 4, a measurement-target object 301A of the present embodiment is provided with no screw holes.

Meanwhile, the case main body 12 of the sensor device 10 is made of metal, as described earlier. Therefore, the sensor device 10 can be attached to a magnetic object.

So, with this embodiment, for example, a thin magnet sheet 401 is attached to the measurement-target object 301A. Since the magnet sheet 401 shown in FIG. 4 is magnetic, the sensor device 10 can be attracted to the magnet sheet 401. Furthermore, the magnet sheet 401 is formed to have a thickness that has no impact on the measurement of physical quantities by the sensor device 10. Note that the actual thickness varies depending on the mode of embodiment.

Note that, although an example to use the magnet sheet 401 will be described below with the present embodiment, any medium may be used as long as it is a magnet.

By this means, the sensor device 10 can be attached to the measurement-target object 301A by using the magnet sheet 401, without using screws or the like.

Furthermore, the technique for attaching the sensor device 10 by using a magnetic force is not limited to the above-described technique. For example, if the measurement-target object 301A is a magnetic object, the sensor device 10 may be attached to the measurement-target object 301A directly. Also, if the measurement-target object 301A is a magnetic substance, the magnet sheet 401 may be fixed to the case main body 12.

Furthermore, for the technique for attaching the sensor device 10 to the measurement-target object 301A, other techniques may be used such as using an adhesive or the like.

As described above, even when non-screwing techniques for attachment such as magnetic attachment and bonding are used, it is still possible to achieve the same effect as in the above-described first embodiment.

Third Embodiment

As for the technique for attaching the sensor device to the measurement-target object, a variety of techniques other than those used in the above-described embodiments is possible. So, with a third embodiment, an example in which a male-threaded part is provided in the case main body of the sensor device will be described below.

Figure 5:
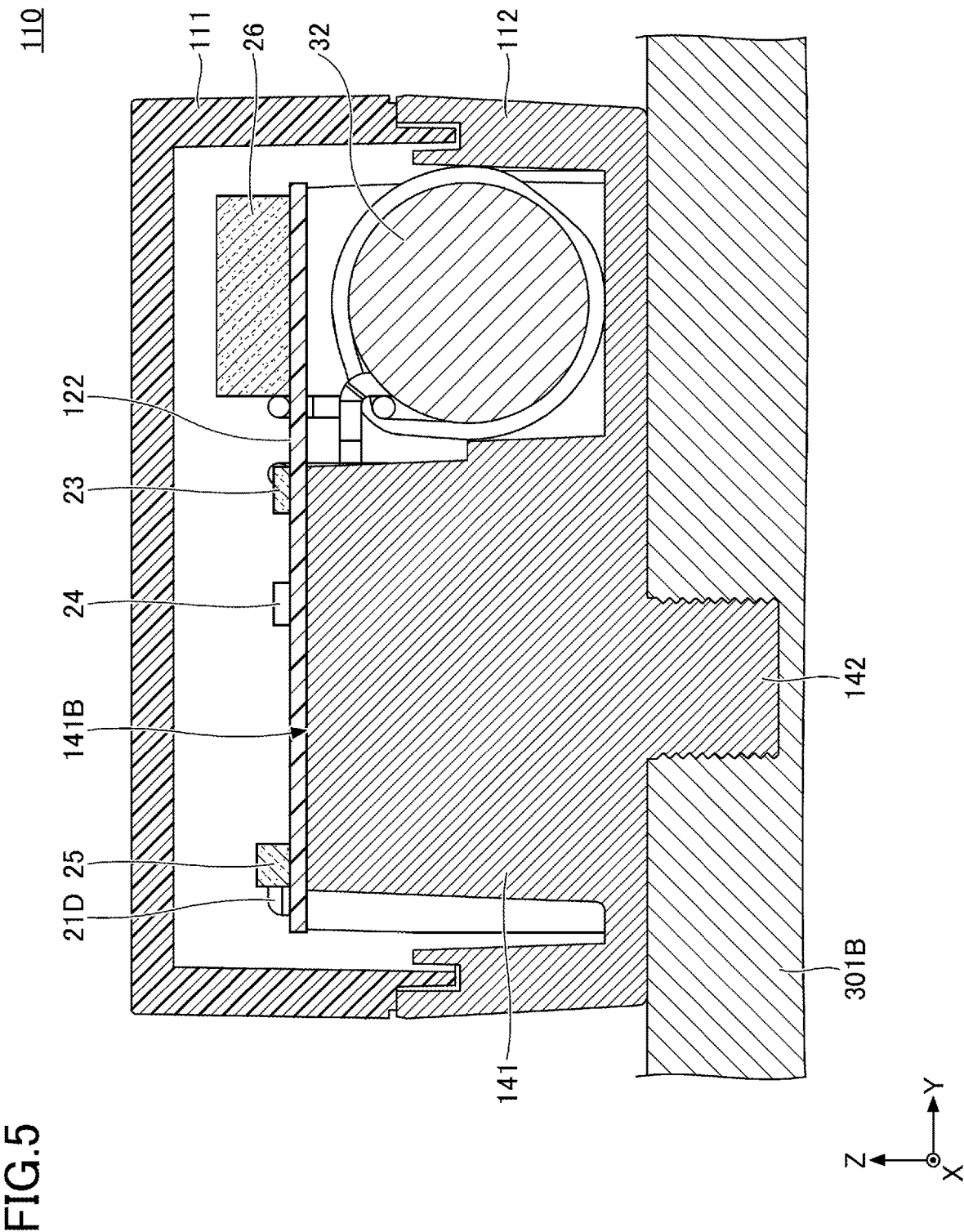
FIG. 5 is a cross-sectional view of a sensor device 110 according to a third embodiment, showing a state in which the sensor device 110 is attached to a measurement-target object.

FIG. 5 is a cross-sectional view of a sensor device 110 according to the present embodiment, showing a state in which the sensor device 110 is attached to an object that is targeted for measurement. Note that parts of the sensor device 110 according to the present embodiment that are the same as in the above-described embodiments will be assigned the same reference signs, and their description will be omitted.

In the example shown in FIG. 5, The sensor device 110 is obtained by fitting a cover body 111 and a case main body 112 together. Also, in the space between the cover body 111 and the case main body 112, a battery 32 and a substrate 122 are provided.

As shown in FIG. 5, unlike in the first embodiment, no through-hole is provided in the cover body 111 and the case main body 112. Likewise, no through-hole is provided in a pedestal part 141 either.

The battery 32 and the wireless communication module 26 are disposed in the same manner as in the first embodiment. Furthermore, a variety of sensors (the acceleration sensor 23, the temperature sensor 24, and the piezo sensor 25) are provided in the same manner as in the first embodiment, but are by no means limited to the arrangement of the first embodiment. It suffices as long as these sensors are disposed at positions to face the end surface 141B of the pedestal part 141 via the substrate 122.

Unlike in the first embodiment, in the example shown in FIG. 5, no through-hole 15 is provided in the sensor device 10. Instead, a male-threaded part 142 is formed in the case main body 112 of the sensor device 110. Also, a female-threaded part to correspond with the male-threaded part 142 is formed in the measurement-target object 301B.

This allows the worker to rotate the male-threaded part 142 of the sensor device 110 so as to screw into the female-threaded part of the measurement-target object 301B, thereby screwing the sensor device 110 to the measurement-target object 301B without using separate screws or the like.

By providing the sensor device 110 of the present embodiment in the above-described structure, the worker can attach the sensor device 110 to the measurement-target object 301B with ease. Furthermore, as in the embodiments described above, the sensor device 110 according to the present embodiment can accurately measure the physical quantities produced in the measurement-target object 301B such as vibration and temperature.

Fourth Embodiment

The internal structures of the sensor devices shown in the above embodiments are simply examples, and a variety of modes of internal structures are possible for the sensor device. Therefore, with a fourth embodiment, an example to provide multiple batteries in the sensor device will be described below.

Figure 6:
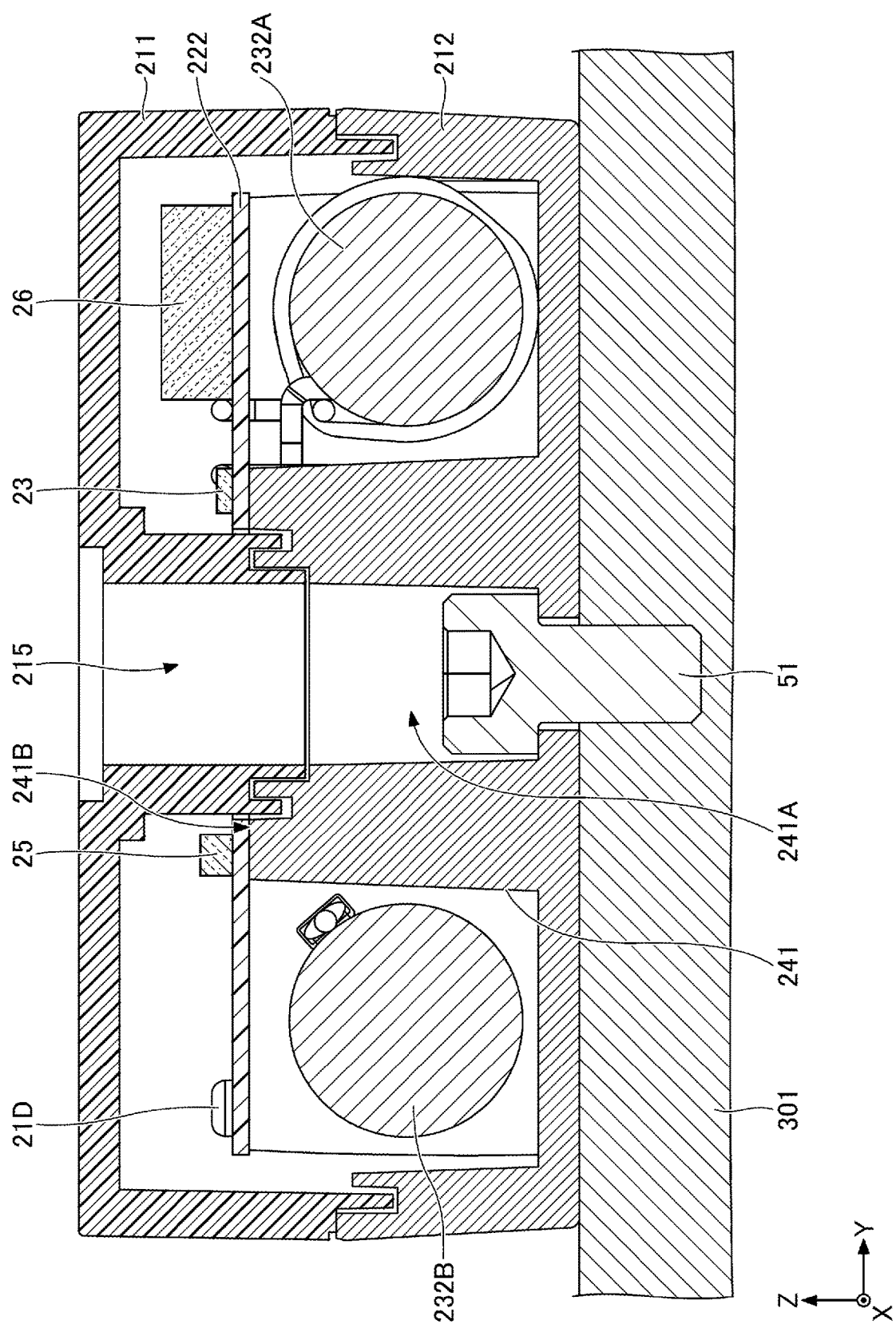
FIG. 6 is a cross-sectional view of a sensor device 210 according to a fourth embodiment, showing a state in which the sensor device 210 is attached to a measurement-target object.

FIG. 6 is a cross-sectional view of a sensor device 210 according to the present embodiment, showing a state in which the sensor device 210 is attached to an object that is targeted for measurement. Note that parts of the sensor device 210 according to the present embodiment that are the same as in the above-described embodiments will be assigned the same reference signs, and their description will be omitted.

In the example shown in FIG. 6, the sensor device 210 is obtained by fitting a cover body 211 and a case main body 212 together. Then, in the space between the cover body 211 and the case main body 212, two batteries 232A and 232B and a substrate 222 are provided. Note that, although an example in which two batteries 232A and 232B are provided will be described with the present embodiment, the number of batteries to place in the sensor device 210 is by no means limited to this, and three or more batteries may be provided.

As shown in FIG. 6, similar to the first embodiment, a through-hole 215 is provided in the cover body 211 and the case main body 212 according to the present embodiment. In accordance with this, a through-hole 241A is also provided in a pedestal part 241.

Furthermore, in the substrate 222, too, an opening portion to correspond with the through-hole 215 is provided. The four corners of the substrate 222 of the present embodiment are screwed by using screws 21A to 21D, similar to the substrate 22 of the first embodiment.

Assume that the arrangement of the wireless communication module 26 is the same as in first embodiment. Furthermore, a variety of sensors (the acceleration sensor 23, the temperature sensor 24, and the piezo sensor 25) are disposed at positions to face the end surface 241B of the pedestal part 241 via the substrate 222. By this means, it is still possible to bring about the same effect as in the first embodiment.

One battery 232A is provided near the wall portion of the case main body 212 on the positive Y-axis direction side. The other battery 232B is provided near the wall portion of the case main body 212 on the negative Y-axis direction side. Compared to the substrate 222, the batteries 232A and 232B are provided near the pedestal part 241 (on the negative side in the Z-axis direction).

By this means, the sensor device 210 of the present embodiment brings about the same effect as the sensor device 10 of the first embodiment, and, providing a number of batteries makes it possible to transmit information for a long period of time compared to the sensor device 10 of the first embodiment. By this means, the measurement-target object can be monitored for a long period of time without, for example, replacing the battery of the sensor device 210 or the like.

Although examples have been described with the above embodiments in which a cover body made of a synthetic resin material is provided to fit with the case main body of the sensor device 210, the above-described embodiments are by no means limited to examples in which the cover body is provided in the case main body, and it is equally possible to seal the substrate-mounting case main body with resin such that the substrate is covered (the resin-sealing being an example cover member).

The above-described embodiments have shown exemplified modes of sensor devices according to the present disclosure, and yet other modes of embodiment may be still possible. For example, multiple pedestal seats may be provided in the sensor device, and a variety of sensors may be provided on the respective substrates of these pedestal parts so as to face the end surfaces of the pedestal parts.

In the above-described embodiments, a variety of sensors (the acceleration sensor 23, the temperature sensor 24, and the piezo sensor 25) are mounted on the upper surface of the substrate 22, but these sensors may be mounted on the lower surface of the substrate 22. In this case, each sensor may be disposed so as to come into contact with the end surface 41B of the pedestal part 41.

The sensor devices according to the herein-contained embodiments make possible simplified internal structures such as structure with a single substrate, so that the manufacturing cost can be reduced. Furthermore, the sensor devices according to the herein-contained embodiments store the battery on the same side as the pedestal part with respect to the substrate, thereby providing simplified storage structures, so that the number of parts can be reduced, and the assembly of the sensor device is facilitated. With the sensor devices according to the herein-contained embodiments, the number of parts is reduced and a single substrate is used, thereby reducing the size of the product.

With the sensor devices according to the herein-contained embodiments, physical quantities related to physical phenomena caused by the measurement-target object can be collected by using an external device. Then, the administrator can analyze information, including the physical quantities collected, by using an application that runs on the external device, so that it is possible to know when the measurement-target object is deteriorated, when parts that constitute the measurement-target object need to be replaced, and so forth, and reduce the cost of maintenance and the workload of the workers.

Although embodiments of the present disclosure have been described in detail above, the present disclosure is by no means limited to these embodiments, and various changes and modifications are possible within the scope of the present disclosure as recited in the herein-contained claims.

What is claimed is:

1. A detection device comprising:
   a case member;
   a cover member;
   a substrate formed of a single uniform layer and provided in a space that is entirely surrounded by the case member and the cover member and having a wireless communication circuit and a sensor mounted thereon and configured to measure a physical quantity;
   a battery housed in the space; and a metal pedestal part that is integrally formed with the case member and disposed in the space on a same side as the case member, wherein the metal pedestal part has an end portion facing the sensor in the space, wherein the case member has a surface that is in contact with a measurement-target object, said surface being at an opposite side of the case member relative to the end portion and the metal pedestal part, wherein the substrate is provided in contact with the end portion of the metal pedestal part, and the sensor is disposed at a position overlapping with the end portion in a direction perpendicular to the surface, wherein the battery is housed in part of the space that is on a same side as the metal pedestal part with respect to the substrate, and wherein the sensor is arranged on the substrate in an area of the substrate on a first surface such that there is only the metal pedestal part and the substrate between an entirety of the sensor and the measurement-target object.

2. The detection device according to claim 1, wherein the sensor is at least one of a vibration sensor configured to measure a vibration of an object that is targeted for measurement, to which the detection device is attachable, and a temperature sensor configured to measure a temperature of the measurement-target object.

3. The detection device according to claim 1, wherein the case member and the metal pedestal part are integrally formed.

4. The detection device according to claim 1, wherein a distance from the surface of the case member on a side of the measurement-target object to the end portion of the metal pedestal part is longer than a height of the battery in a same direction.

5. The detection device according to claim 1, wherein, in the metal pedestal part, a screwing through-hole for fixing the detection device externally via the case member is provided.

6. The detection device according to claim 1, wherein the substrate is provided to be in contact with the end portion of the metal pedestal part, and wherein the sensor is provided to face the end portion via the substrate.

7. The detection device according to claim 1, further comprising a plurality of screw receiving parts having holes for fitting screws, each screw receiving part extending from the case member, into the space, in a direction of the cover member, over a length substantially matching a length of the metal pedestal part in the direction, wherein the substrate is fixed between a plurality of screws and the plurality of screw-receiving parts in which the screws are fitted.

8. The detection device according to claim 1, wherein the sensor is mounted on the substrate so as not to be in direct contact with the measurement-target object.

9. The detection device according to claim 1, wherein sensor includes a piezo sensor.

10. The detection device according to claim 1, wherein the sensor is directly supported on a first side of the substrate, and the sensor is directly supported by the metal pedestal part on a second side of the substrate so the physical quantity is transmitted into the sensor through the path.

* * * * *